United States Patent [19]

Ahamed

[11] 4,142,066
[45] Feb. 27, 1979

[54] SUPPRESSION OF IDLE CHANNEL NOISE IN DELTA MODULATION SYSTEMS

[75] Inventor: Syed V. Ahamed, Gillette, N.J.

[73] Assignee: Bell Telephone Laboratories, Incorporated, Murray Hill, N.J.

[21] Appl. No.: 864,500

[22] Filed: Dec. 27, 1977

[51] Int. Cl.² ............ H03K 13/22; H04B 15/00
[52] U.S. Cl. ................ 179/1 P; 179/1 SA; 325/38 B; 332/11 D
[58] Field of Search ........... 179/1 P, 1 VC, 1 VL; 340/347 DA, 347 DD; 325/38 B, 155; 332/11 D

[56] References Cited

U.S. PATENT DOCUMENTS

| | | | |
|---|---|---|---|
| 3,516,022 | 6/1970 | Brolin | 332/11 D |
| 3,855,555 | 12/1974 | Burkhard et al. | 325/38 B |

Primary Examiner—Kathleen H. Claffy
Assistant Examiner—E. S. Kemeny
Attorney, Agent, or Firm—Henry T. Brendzel

[57] ABSTRACT

Disclosed is a method and apparatus for encoding speech with correct encoding of silence periods. In the disclosed apparatus, the speech signal is processed in contiguous blocks, and each block is tested, by evaluating a window of blocks in the neighborhood of the tested block, to determine whether the tested block represents a silence interval. When it is determined that a processed block represents silence, the processed block is forced to encode as a perfect silence. This forcing is accomplished by substituting the encoded block with a preselected silence sequence of alternating "1" and "0" strings.

8 Claims, 2 Drawing Figures

SUPPRESSION OF IDLE CHANNEL NOISE IN DELTA MODULATION SYSTEMS

BACKGROUND OF THE INVENTION

1. Field of the Invention

This invention pertains to speech processing and, more particularly, to digital speech processing in a delta modulation environment.

2. Description of the Prior Art

Speech processing, which includes speech recognition and synthetic generation of speech, is most commonly carried out with digital means because, generally, speech processing requires considerable amount of processing and storage. Digitally encoded speech, however, contains quantization noise which results from the quantizing process, and also, digitally encoded speech lacks the simplicity with which amplitude, frequency, noise, or silence can be ascertained.

In speech recognition applications, detection of silence periods between utterances is obviously important for recognizing the speech since the instants of utterance beginnings and endings must be known. Additionally, detection of silence periods aids in reducing the storage and processing burden because no processing is required to be performed during silence periods. In *An Algorithm for Locating the Beginning and End of an Utterance Using ADPM Coded Speech,* BSTJ Volume 53, No. 6, July–August, 1974, pages 1127–1135, Rosenthal et al. describe a method for detecting silence periods in an Adaptive Differential Pulse Code Modulation (ADPCM) system. The described method utilizes the fact that when silence occurs in an ADPCM encoded system, the step size seeks its minimum value and the resulting code words vary only slightly. This fact is embodied in the described test that evaluates a "code word energy" function, which is defined as the sum of squares of the code words over a 101 sample window centered about a center sample. The evaluated energy function is compared to a threshold and, based on the threshold decision, a determination as to the existence of silence is made.

In applications where speech is encoded, stored, and reconstituted for speech synthesis purposes, signal behavior during silence periods is of additional concern because system noise is most noticeable during silence periods. This noise, called idle channel noise, predominantly originates from the time and amplitude truncation of the digitizing operation and from the imperfections of the encoder. A perfect delta modulator, for example, would respond to a perfect silence input signal (0 volts DC) by developing a bit sequence of alternating "1"s and "0"s. In actual delta modulation encoders, the ideal bit pattern is not achieved but is interspersed with random sequences of consecutive "1"s and/or "0"s. The auditory result of the consecutive "1"s and/or "0"s is noise.

In adaptive delta modulators, where the step size is dependent on the sequence of output bits, limit cycles are sometimes established during silence periods, and those limit cycles, when decoded, develop an annoying hum.

SUMMARY OF THE INVENTION

In digitizing speech for transmission or for storage and subsequent synthesis of the speech, it is highly desirable to substantially reduce or to completely eliminate the noise developed by the digitizing process.

It is an object of this invention, therefore, to encode signals, including noise periods, so that the silence periods produce no errors.

It is another object of this invention to detect silence periods in speech and to encode those silence periods with a bit pattern containing alternating "1" and "0" strings that would decode to a perfect silence.

These and other objects and advantages are realized by detecting silence periods in the input signal and by substituting the encoded bits during the detected silence periods with a bit sequence of alternating "1" and "0" strings. In a digital implementation of the means for detecting silence periods, which means is responsive to the encoded bit sequence of the input signal, a narrow block of encoder output bits, called a word, is selected, and a decision is made as to whether the selected word represents a silence period based on the characteristics of a preselected number of words which form a window in the neighborhood of the word under consideration. The test for silence is made in three steps. The first step counts the number of transitions from "0" to "1" in the window and compares that number to a first threshold. The second step determines the longest string of consecutive "1" bits in the window and compares the length of that string to a second threshold. The third step determines the longest string of consecutive "0" bits in the window and compares the length of that string to a third threshold. When it is determined that the number of transitions is above the first threshold, the longest number of consecutive "1"s is below the second threshold, and the longest number of consecutive "0"s is below the third threshold, then it is concluded that the word under consideration represents silence.

DETAILED DESCRIPTION

In accordance with the principles of this invention, the speech signal is processed in contiguous blocks, and each block is tested, by evaluating a window of blocks in the neighborhood of the tested block, to determine whether the tested block represents a silence interval. When it is determined that a processed block represents silence, the processed block is forced to encode as a perfect silence. This forcing is accomplished by substituting the encoded block with a preselected silence sequence of alternating "1" and "0" strings.

Figure 1:
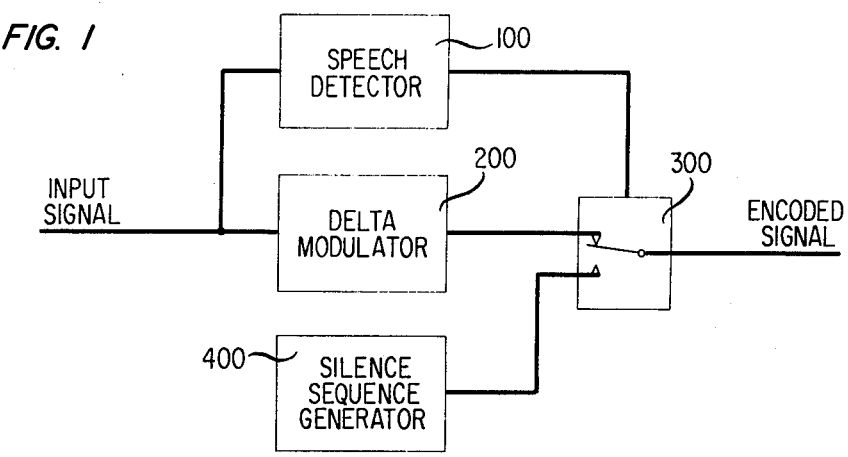
FIG. 1 depicts a general block diagram of apparatus employing the principles of this invention.

In FIG. 1, the input signal is applied to speech detector 100 and to delta modulator 200. Detector 100 may be a conventional speech detector responsive to the analog input signal, such as described by J. H. Park, Jr. et al. in U.S. Pat. No. 3,723,667, issued Mar. 27, 1973, and modulator 200 may be a conventional delta modulator (adaptive or otherwise) such as, for example, U.S. Pat. No. 3,624,558, issued to S. J. Brolin on Nov. 30, 1971. Detector 100 may also comprise a delta modulator followed by a digital detector or, alternatively, detector 100 may comprise a digital detector that is directly responsive to the output signal of delta modulator 200, rather than to the input signal.

The encoded output bit sequence of modulator 200 is applied to one input of an SPDT digital switch, 300, and the output signal of a silence sequence generator, 400, is applied to the other input of switch 300. Switch 300 is controlled by speech detector 100. Whenever detector 100 determines that the input signal represents silence, switch 300 is caused to substitute the silence sequence of generator 400 for the output bit sequence of modulator 200.

With respect to the silence sequence of generator 400, as indicated previously, a perfect delta modulation encoder would generate a string of alternating 1,0 bits which is repeated as long as the encoder input is sufficiently close to zero. This is not the only encoded output that could decode into a perfect silence. Looking at the frequency domain, both the input signal to be encoded and the decoded signal are audio signals which are band limited to some upper frequency $f_h$. The encoding clock frequency, $f_c$, is considerably higher than $f_h$, and the bit sequence 1,0 (repeated) has frequency lines at $f_c/2$, $3f_c/2$, $5f_c/2$, et cetera. These lines are outside the audio band of interest as long as $f_h$ is less than $f_c/2$. With this perspective, it is clear that other bit sequences could also decode into pure silence. For example, the bit sequence 1,1,0,0 (repeated) has frequency lines at $f_c/4$ and certain multiples thereof, and as long as $f_h$ is less than $f_c/4$, a pure silence is decoded. Other silence sequences are, of course, also possible.

Figure 2:
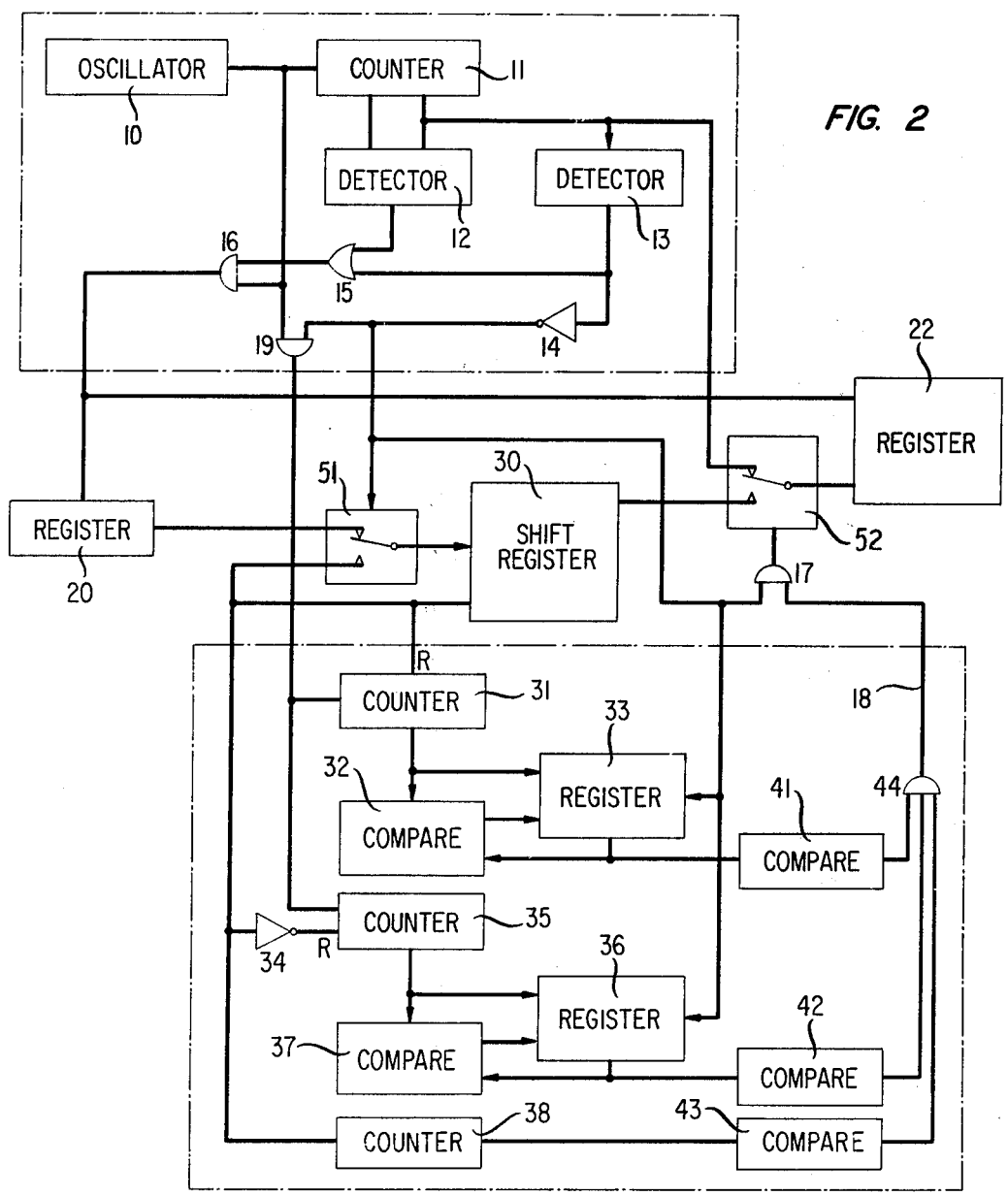
FIG. 2 is a detailed schematic diagram of the apparatus of FIG. 1.

The FIG. 2 embodiment of this invention is based on the fact that a nonsilence analog speech signal displays various positive and negative excursions from zero and that such signals are encoded in a delta modulator with strings of consecutive "1" bits - for positive excursions, and with strings of consecutive "0" bits - for negative excursions. Short strings of consecutive "1" or "0" bits represent small analog excursions while long strings represent large excursions.

The fact that a signal varies about zero volts assures only that a perfect silence is not present, but does not assure, of course, that the signal present represents speech and not noise. Speech differs from noise, however, in its contents of high frequency components, and that difference manifests itself in the character of the speech signal. In an analog representation, a noise signal is generally more "wiggly" than a speech signal. In delta modulated form, a noise signal has a large number of transitions from "1" to "0" and vice versa.

FIG. 2 depicts a detailed schematic diagram of apparatus for implementing the method of this invention with a digital speech detector. The structure of the FIG. 2 apparatus is based on the assumption that the encoding frequency is low enough for all the processing to be completed between the sampling and encoding instants of the delta modulator, or more particularly, between the instants when encoded data is applied to the processing section of the FIG. 2 apparatus, which is the effective data clock rate. Since, in accordance with the method of this invention, it is blocks, or words, of signals that are processed, corresponding to an encoded sequence of, for example, sixteen bits per word, the effective data clock rate is equal to the encoding clock frequency of the delta modulator, divided by the number of bits per word. In a modulator employing a 16 kHz sampling clock, and in an implementation having 16 bits per word, the sampling interval is 1 millisecond (or 1 kHz rate). If a window of 127 blocks is selected (a center processing block and 63 blocks on either side) a processing clock of 128 kHz would suffice.

Comporting with the above-outlined approach, oscillator 10 in FIG. 2 (e.g., an astable multivibrator) develops a 128 kHz square waveform signal. That signal, called the clock, is applied to binary counter 11 which is a divide-by-2048 counter, and the output of counter 11 is applied to detectors 12 and 13. Detector 12 is a word recognizer that detects multiples of 128 in the states of counter 11 and develops thereby a one clock period output pulse train having a 1 millisecond period. Detector 13, which is also a word recognizer, detects one set of 16 consecutive states in counter 11 (e.g., 0 through 15). The output signals of detectors 12 and 13 are connected to OR gate 15, and the output of OR gate 15 is connected to one input of AND gate 16. Another input of AND gate 16, and one input of two-input AND gate 19 are connected to the clock of oscillator 10, while the other input of AND gate 19 is connected, via inverter gate 14, to the output of detector 13.

The output signal of the first stage in counter 11 alternates between logic "1" and logic "0" with each period of the clock. It, therefore, is employed as the silence sequence. The output signal of AND gate 16 includes a clock pulse every 128 periods of the clock and a burst of sixteen clock pulses once every 2048 clock pulses. This signal is termed the sampling clock. The output signal of inverter 14 is high for all but sixteen clock pulses out of the 2048 pulses in the repetition rate of counter 11. This signal is termed the switch control signal. The output signal of gate 19 is termed the processing clock control signal.

Returning to the description of FIG. 2, input signals are shifted into a sixteen bit shift register, 20, by the sampling clock. The output signal of register 20 is applied to 2032 bit shift register 30 (which is responsive to the clock control signal and which has a center tap after 1024 bits) through one input of switch 51, which is an SPDT switch responsive to the switch control signal. Switch 51 may be implemented with a Texas Instruments Incorporated SN54155 integrated circuit. The other input of switch 51 is responsive to the end-output of shift register 30 (2032 bits past the register input).

The center-tap output of shift register 30 is applied to one input of SPDT switch 52 (implementable with another SN54155) and the other input of switch 52 is responsive to the silence sequence. Switch 52 is controlled by the output signal of AND gate 17, which in turn is responsive to the switch control signal and to a silence indicator signal on line 18. The output signal of switch 52 is connected to sixteen-bit shift register 22 which, like register 20, is responsive to the sampling clock. The output signal of shift register 22 is the encoded output signal as modified for pure silence.

In addition to being applied to switch 51, the end-output signal of shift register 30 is connected to the reset lead of counter 31, to counter 38 and, through inverter gate 34, to the reset lead of counter 35. With this interconnection, every occurrence of a logic "0" at the end-output of register 30 resets counter 31, every occurrence of a logic "1" at the end-output of register 30 resets counter 35, and every transition from "1" to "0" advances counter 38. Counters 31 and 35 are clocked with the processing clock, causing counters 31 and 35 to continuously count strings of "0" bits and "1" bits, respectively. Counter 38 counts "1" to "0" transitions.

Associated with counter 31 is register 33, which is responsive to counter 31; and comparator 32, which is responsive to counter 31 and to register 33. Register 33 maintains the count of the longest string of "1"s in the data stored in register 30 because its output is compared to the output of counter 31 and, whenever the output of counter 31 exceeds that of register 33, comparator 32 causes the output of counter 31 to be stored in register 33. Associated with counter 35 is register 36, connected to counter 35; and comparator 37, responsive to register 36 and to counter 35. Similar to register 33, register 36 maintains the count of the longest string (of "0"s) detected by counter 35. Registers 33 and 36 are reset by the switch control signal.

The output signals of elements 33, 36, and 38 are applied to comparators 41, 42, and 43, respectively, where the longest "1" string is compared to a first threshold, e.g., the numeral 3; the longest "0" string is compared to a second threshold, e.g., the numeral 3; and the number of transitions is compared to a third threshold, e.g., the numeral 1664. A logic "1" is caused to be produced at the output of comparators 41, 42, and 43 when the first threshold is not exceeded, the second threshold is not exceeded, and the third threshold is exceeded, respectively. The output signals of comparators 41, 42, and 43 are applied to AND gate 44 which develops a logic "1" output signal (on lead 18) when the above three conditions are met. When that happens, switch 52 reverses its state (under control of the signal on line 18) and applies the silence sequence to register 22.

What is claimed is:

1. A delta modulation system including a delta modulator for encoding an analog input signal, the improvement comprising:
   a speech detector for ascertaining periods of silence in said input signal;
   a silence sequence generator; and
   a switch responsive to said delta modulator and to said silence detector for selecting, under control of said speech detector, the output signal of said delta modulator or the output signal of said silence sequence generator.

2. The apparatus of claim 1 wherein said speech detector is responsive to the output signal of said modulator.

3. The apparatus of claim 1 wherein said switch selects said output signal of said silence sequence generator whenever said speech detector ascertains a period of silence in said input signal, and selects the output signal of said modulator, otherwise.

4. The apparatus of claim 1 wherein said speech detector is responsive to the input signal of said modulator.

5. The apparatus of claim 4 wherein said speech detector includes means for processing a sliding window of output bits of said modulator, with said window including a first preselected number of bits.

6. The apparatus of claim 5 further including means for measuring the longest string of "1"s in said sliding window, the longest string of "0"s in said sliding window, the number of transitions in said sliding window, and means for processing the measured longest string of "1"s, the longest string of "0"s, and the number of transitions to determine periods of silence.

7. The apparatus of claim 6 wherein said means for processing comprises:
   means for comparing said measured longest string of "1"s to a first threshold;
   means for comparing said longest string of "0"s to a second threshold;
   means for comparing said number of transitions in said sliding window to a third threshold; and
   means for indicating that the encoded signal within said window represents a silence period whenever said longest string of "1"s fails to exceed a first threshold, said longest string of "0"s fails to exceed a second threshold, and said number of transitions exceeds a third threshold.

8. A method for correcting the delta modulation encoding of silence periods in an encoded representation of an input signal characterized by the steps of:
   subdividing said input signal into blocks;
   for each block, ascertaining the character of said input signal within a window in the neighborhood of said each block; and
   when a silence is ascertained in said step of ascertaining, replacing the delta modulation encoded representation of said each block with a preselected bit sequence.

* * * * *